(12) United States Patent
Wachtfogel et al.

(10) Patent No.: US 7,447,315 B2
(45) Date of Patent: Nov. 4, 2008

(54) SYSTEM FOR DETERMINING SUCCESSFUL RECEPTION OF A MESSAGE

(75) Inventors: Avi Wachtfogel, Jerusalem (IL); Yishai Sered, Newton, MA (US)

(73) Assignee: NDS Limited, West Drayton, Middlesex (GB)

( * ) Notice: Subject to any disclaimer, the term of this patent is extended or adjusted under 35 U.S.C. 154(b) by 272 days.

(21) Appl. No.: 11/000,254

(22) Filed: Nov. 30, 2004

(65) Prior Publication Data

US 2005/0100164 A1    May 12, 2005

Related U.S. Application Data

(63) Continuation of application No. 09/728,824, filed on Nov. 29, 2000, now Pat. No. 6,848,051, which is a continuation of application No. PCT/IL00/00103, filed on Feb. 20, 2000.

(30) Foreign Application Priority Data

Mar. 29, 1999    (IL) ........................... 129230

(51) Int. Cl.
*H04L 9/00* (2006.01)
(52) U.S. Cl. .................. 380/278; 380/201; 380/213; 380/268; 725/31
(58) Field of Classification Search ............... 380/210, 380/213, 201, 239, 268, 278; 348/E7.056, 348/E5.004; 725/31; 713/150, 170, 181; 455/436; 370/419

See application file for complete search history.

(56) References Cited

U.S. PATENT DOCUMENTS 5,282,249 A    1/1994  Cohen et al.
5,481,609 A    1/1996  Cohen et al.

(Continued)

FOREIGN PATENT DOCUMENTS

EP    0 428 252 A1    5/1991

(Continued)

OTHER PUBLICATIONS

ETSI Technical Report, ETR 289, "Digital Video Broadcasting (DVB); Support for use of scrambling and Conditional Access (CA) within digital broadcastng systems" Oct. 1996, 13 pp.

(Continued)

*Primary Examiner*—Thanhnga B Truong
(74) *Attorney, Agent, or Firm*—Husch Blackwell Sanders LLP Welsh & Katz

(57) ABSTRACT

A method for determining that all of a scrambled message has been successfully received, the scrambled message being scrambled in accordance with a scrambling key and being capable of being descrambled in accordance with a descrambling key, descrambling key generating information for generating the descrambling key being included within a control message (ECM) associated with the scrambled message. The method includes providing a scrambled message scrambled in accordance with a scrambling key, generating an unmodified ECM including descrambling key generating information for generating a descrambling key for descrambling the scrambled message, generating a first derived value based on the scrambled message using a first value derivation function, applying a first modification function to the unmodified ECM, the first modification function being based, at least in part, on the first derived value, thereby producing a modified ECM, transmitting the scrambled message and the modified ECM to a receiver, and performing, at the receiver, the following steps: generating a second derived value based on the received scrambled message using a second value derivation function, applying a second modification function to the modified ECM, the second modification function being based, at least in part, on the second derived value and being an inverse of the first modification function, thereby producing the unmodified ECM, and employing the unmodified ECM to determine that all of the message has been successfully received. Related apparatus and methods are also provided.

11 Claims, 3 Drawing Sheets

U.S. PATENT DOCUMENTS

| | | | | |
|---|---|---|---|---|
| 5,774,548 | A | * | 6/1998 | Bando et al. ............... 380/212 |
| 6,035,037 | A | * | 3/2000 | Chaney ...................... 380/227 |
| 6,061,451 | A | * | 5/2000 | Muratani et al. ........... 380/201 |
| 6,069,956 | A | * | 5/2000 | Kurihara ..................... 380/212 |

FOREIGN PATENT DOCUMENTS

| | | |
|---|---|---|
| EP | 0 817 485 A1 | 6/1996 |
| WO | WO-96/06504 A1 | 2/1996 |
| WO | WO-97/35430 A1 | 9/1997 |
| WO | WO-99/45711 A1 | 9/1999 |

OTHER PUBLICATIONS

ETSI Technical Specification TS 101, 197-1, v 1.1.1. "Digital Video Broadcasting (DVB); DVB SimulCrypt; Part 1: Head-end architecture and synchronization" (Jun. 1997), 45 pp.

ISO/IEC 12818-6:1998/Amd. 1:2000(E), "Information technology—Generic coding of moving pictures and associated audio information—Part 6:Extensions for DSM-CC" (Divided into vol. 1 and vol. 2), pp. 1-542.

* cited by examiner

SYSTEM FOR DETERMINING SUCCESSFUL RECEPTION OF A MESSAGE

RELATED APPLICATION INFORMATION

The present application is a continuation application of U.S. patent application Ser. No. 09/728,824, of Avi Wachtfogel et al., filed 29 Nov. 2000, now U.S. Pat. No. 6,848,051, which is a continuation of International Application number PCT/IL00/00103 of NDS Limited, filed 20 Feb. 2000.

FIELD OF INVENTION

The present invention relates to communications systems in general, and more particularly to systems for ensuring proper receipt of a message, particularly by determining that a message has been properly received.

BACKGROUND OF THE INVENTION

Systems and subsystems for ensuring proper receipt of a message in a communication system are well-known in the art. Often, such systems are based on two-way communication; a receiver acknowledges receipt of a message, or of one or more submessages, received from a sender or transmitter, the acknowledgment being sent back to the sender or transmitter. Alternatively, a receiver might request re-transmission of messages or submessages which were not received, the absence of such a request being interpreted similarly to an acknowledgment. A particular part of ensuring proper receipt is determining whether or not the message has been properly received.

Systems for sending and receiving scrambled messages are well known in the art. The term "scrambling" in all of its grammatical forms, as used throughout the present specification and claims, refers to any method of scrambling, encoding or encrypting data, many such methods being well-known in the art.

Systems for scrambling television signals, and controlling access thereto, are well known in the art. One such system is described in the following U.S. Pat. No. 5,282,249 to Cohen et al.; and U.S. Pat. No. 5,481,609 to Cohen et al. Scrambled television data streams described in the Cohen et al. patents comprise both scrambled data representing television signals and coded control messages, also known as ECMs. The ECMs of Cohen et al comprise, in a coded form, data necessary for generating a control word (CW) which may be used to descramble the scrambled data representing television signals.

While the two patents to Cohen et al. describe an analog system, that is, a system in which analog television data streams are broadcast to television sets, it is appreciated that similar ECM methods may also be used for digital television data streams. Generally, the scrambling techniques used for scrambling analog television signals such as, for example, the well known "cut-and-rotate" technique, are chosen for their applicability to analog signals. In scrambling of digital television signals other scrambling techniques, well-known in the art, are used, the techniques being more appropriate to digital signals such as, for example, applying the well-known DES algorithm to the digital television signals.

It is also known in the art to apply methods analogous to those used for television scrambling to data scrambling particularly in the case of digital methods.

Methods of transmitting a scrambled digital signal, including ECMs, are described in the MPEG-2 standard, ISO/IEC 13818-6, 12 Jul. 1996 and subsequent editions.

Other methods relevant to conditional access techniques employing ECMs are described in the following documents:

ETR 289. "Digital Video Broadcasting (DVB): Support for use of scrambling and Conditional Access (CA) within DVB systems", and TS 101 197-1 V1.1.1 (1997-06): "Digital Video Broadcasting (DVB); DVB SimulCrypt; Part 1: Head-end architecture and synchronization".

Methods of transmitting ECMs that are particularly suitable for use in a data broadcasting environment are described in applicant's co-pending unpublished Israel patent application 123554, corresponding to PCT international application PCT/IB99/00509, published as WO 99/45711 on 10 Sep. 1999.

It is well-known in the prior art for known forms of ECM processing, including creating and interpreting an ECM, to take place in an IC card, commonly known as a smart card.

The disclosures of all references mentioned above and throughout the present specification are hereby incorporated herein by reference.

SUMMARY OF THE INVENTION

The present invention seeks to provide an improved system for determining that all of a scrambled message has been successfully received. In the present invention, a scrambled message, typically but not necessarily a message divided into submessages, is transmitted to a receiver. At least one ECM is also transmitted to the receiver, as is well-known in the art. While the problem of determining proper receipt will generally be described herein, it is appreciated that determining proper receipt may be part of a larger system for ensuring proper receipt of a message, and that the present invention might be combined with appropriate components in a larger system for ensuring proper receipt of a message.

The transmitted ECM of the present invention comprises a modified ECM, modified based on an appropriate value derived from the scrambled message itself. In order to successfully decode the scrambled message, the receiver reverses the modification of the ECM by deriving a value from the scrambled message and employing the derived value to reverse the modification of the ECM.

The method or function for deriving a value is preferably chosen appropriately, such that the derived value will depend on the entire scrambled message. Thus, it will not be possible to descramble even a portion of the scrambled message without both the ECM and the entire scrambled message. In this way, the goal of determining or ensuring that the entire scrambled message is received is realized.

It is appreciated that the present invention may be particularly useful in a system where customers pay for received messages only if the entire message is received. The present invention deters unscrupulous customers from utilizing partially received messages for which no payment will be demanded by the provider of the information comprised in the messages, since partially received messages sent using the system of the present invention can not be descrambled by ordinary methods.

There is thus provided in accordance with a preferred embodiment of the present invention a method for determining that all of a scrambled message has been successfully received, the scrambled message being scrambled in accordance with a scrambling key and being capable of being descrambled in accordance with a descrambling key, descrambling key generating information for generating the descrambling key being included within a control message (ECM) associated with the scrambled message, the method including providing a scrambled message scrambled in accordance with a scrambling key, generating an unmodified ECM including descrambling key generating information for generating a descrambling key for descrambling the scrambled message, generating a first derived value based on the scrambled message using a first value derivation function, applying a first modification function to the unmodified ECM, the first modification function being based, at least in part, on the first derived value, thereby producing a modified ECM, transmitting the scrambled message and the modified ECM to a receiver, and performing, at the receiver, the following steps: generating a second derived value based on the received scrambled message using a second value derivation function, applying a second modification function to the modified ECM, the second modification function being based, at least in part, on the second derived value and being an inverse of the first modification function, thereby producing the unmodified ECM, and employing the unmodified ECM to determine that all of the message has been successfully received.

Further in accordance with a preferred embodiment of the present invention the method also includes providing a first smart card, wherein at least one of the following is executed within the first smart card: the step of generating an unmodified ECM, and the step of applying a first modification function.

Still further in accordance with a preferred embodiment of the present invention the method also includes providing a second smart card, wherein at least one of the following is executed within the second smart card: the step of applying a second modification function, and at least a portion of the step of employing the unmodified ECM.

Additionally in accordance with a preferred embodiment of the present invention the employing step includes producing a descrambling key based, at least in part, on the descrambling key generating information, and descrambling the scrambled message using the descrambling key.

Moreover in accordance with a preferred embodiment of the present invention the method also includes determining that all of the scrambled message has been successfully received based on a result of the descrambling step.

Further in accordance with a preferred embodiment of the present invention the determining step includes examining the result of descrambling the scrambled message to determine that the descrambled message is valid.

Still further in accordance with a preferred embodiment of the present invention the first value derivation function and the second value derivation function each includes a hash function.

Additionally in accordance with a preferred embodiment of the present invention the first value derivation function and the second value derivation function are identical.

Moreover in accordance with a preferred embodiment of the present invention the first modification function and the second modification function are complementary.

Further in accordance with a preferred embodiment of the present invention the first modification function and the second modification function are identical.

Still further in accordance with a preferred embodiment of the present invention the first modification function and the second modification function each includes an exclusive-or (XOR) function.

Additionally in accordance with a preferred embodiment of the present invention the scrambled message includes a plurality of scrambled sub-messages, and the transmitting step includes transmitting each of the plurality of scrambled sub-messages, and the performing step includes assembling the plurality of scrambled sub-messages, thereby producing the received scrambled message.

Moreover in accordance with a preferred embodiment of the present invention the performing step includes transmitting an indication that the scrambled message has been completely received.

Further in accordance with a preferred embodiment of the present invention the performing step includes recording an indication that the scrambled message has been completely received.

Still further in accordance with a preferred embodiment of the present invention the indication includes an authorization to charge for receipt of the scramble message.

Additionally in accordance with a preferred embodiment of the present invention the unmodified ECM also includes a signature of the contents of the unmodified ECM, the signature being produced according to a signature generating method.

Moreover in accordance with a preferred embodiment of the present invention the method also includes sending a signature of the contents of the unmodified ECM to the receiver, the signature being produced according to a signature generating method, the signature being separate from the unmodified ECM.

Further in accordance with a preferred embodiment of the present invention the signature generating method produces different signatures when applied to the contents of the unmodified ECM and when applied to the contents of the modified ECM.

Still further in accordance with a preferred embodiment of the present invention the employing step includes verifying the signature.

There is also provided in accordance with another preferred embodiment of the present invention, in a system where a scrambled message is scrambled in accordance with a scrambling key and is capable of being descrambled in accordance with a descrambling key, descrambling key generating information for generating the descrambling key being included within a control message (ECM) associated with the scrambled message, an unmodified ECM including descrambling key generating information for generating a descrambling key for descrambling the scrambled message being generated by the system, a first derived value based on the scrambled message using a first value derivation function being generated by the system, a first modification function being applied to the unmodified ECM, the first modification function being based, at least in part, on the first derived value, thereby producing a modified ECM, the scrambled message and the modified ECM being transmitted to a receiver, a method including, at the receiver generating a second derived value based on the received scrambled message using a second value derivation function, applying a second modification function to the modified ECM, the second modification function being based, at least in part, on the second derived value and being an inverse of the first modification function, thereby producing the unmodified ECM, and employing the unmodified ECM to determine that all of the message has been successfully received.

There is also provided in accordance with another preferred embodiment of the present invention a method for producing a modified ECM for use in a system for determining that all of a scrambled message has been successfully received, the scrambled message being scrambled in accordance with a scrambling key and being capable of being descrambled in accordance with a descrambling key, descrambling key generating information for generating the descrambling key being included within a control message (ECM) associated with the scrambled message, the method including providing a scrambled message scrambled in accordance with a scrambling key, generating an unmodified ECM including descrambling key generating information for generating a descrambling key for descrambling the scrambled message, generating a first derived value based on the scrambled message using a first value derivation function, and applying a first modification function to the unmodified ECM, the first modification function being based, at least in part, on the first derived value, thereby producing a modified ECM.

There is also provided in accordance with another preferred embodiment of the present invention a system for determining that all of a scrambled message has been successfully received, the scrambled message being scrambled in accordance with a scrambling key and being capable of being descrambled in accordance with a descrambling key, descrambling key generating information for generating the descrambling key being included within a control message (ECM) associated with the scrambled message, the system including a scrambler for scrambling a message in accordance with a scrambling key, thereby producing a scrambled message, an ECM generator for generating an unmodified ECM including descrambling key generating information for generating a descrambling key for descrambling the scrambled message, first value derivation apparatus for generating a first derived value based on the scrambled message using a first value derivation function first modifying apparatus for applying a first modification function to the unmodified ECM, the first modification function being based, at least in part, on the first derived value, thereby producing a modified ECM, a transmitter for transmitting the scrambled message and the modified ECM to a receiver, the receiver including second value derivation apparatus for generating a second derived value based on the received scrambled message using a second value derivation function, second modifying apparatus for applying a second modification function to the modified ECM, the second modification function being based, at least in part, on the second derived value and being an inverse of the first modification function, thereby producing the unmodified ECM, and employing apparatus for employing the unmodified ECM to determine that all of the message has been successfully received.

Further in accordance with a preferred embodiment of the present invention the apparatus also includes a first smart card, wherein the first smart card includes at least one of the following: the ECM generator, and the first modifying apparatus.

Still further in accordance with a preferred embodiment of the present invention the apparatus also includes a second smart card, wherein the second smart card includes at least one of the following: the second modifying apparatus, and at least a portion of the employing apparatus.

There is also provided in accordance with another preferred embodiment of the present invention, in a system where a scrambled message is scrambled in accordance with a scrambling key and is capable of being descrambled in accordance with a descrambling key, descrambling key generating information for generating the descrambling key being included within a control message (ECM) associated with the scrambled message, an unmodified ECM including descrambling key generating information for generating a descrambling key for descrambling the scrambled message being generated by the system, a first derived value based on the scrambled message using a first value derivation function being generated by the system, a first modification function being applied to the unmodified ECM, the first modification function being based, at least in part, on the first derived value, thereby producing a modified ECM, the scrambled message and the modified ECM being transmitted to a receiver, apparatus including second value derivation apparatus for generating a second derived value based on the received scrambled message using a second value derivation function, second modifying apparatus for applying a second modification function to the modified ECM, the second modification function being based, at least in part, on the second derived value and being an inverse of the first modification function, thereby producing the unmodified ECM, and employing apparatus for employing the unmodified ECM to determine that all of the message has been successfully received.

There is also provided in accordance with another preferred embodiment of the present invention apparatus for producing a modified ECM for use in a system for determining that all of a scrambled message has been successfully received, the scrambled message being scrambled in accordance with a scrambling key and being capable of being descrambled in accordance with a descrambling key, descrambling key generating information for generating the descrambling key being included within a control message (ECM) associated with the scrambled message, the apparatus including a scrambler for scrambling a message in accordance with a scrambling key, thereby producing a scrambled message, an ECM generator for generating an unmodified ECM including descrambling key generating information for generating a descrambling key for descrambling the scrambled message, first value derivation apparatus for generating a first derived value based on the scrambled message using a first value derivation function, and first modifying apparatus for applying a first modification function to the unmodified ECM, the first modification function being based, at least in part, on the first derived value, thereby producing a modified ECM.

BRIEF DESCRIPTION OF THE DRAWINGS

The present invention will be understood and appreciated more fully from the following detailed description taken in conjunction with the drawings in which.

The following Appendices provide a particular example, not meant to be limiting, of a preferred implementation of a portion of the present invention:

Appendices A and B together comprise a preferred implementation, in the C programming language, of a digital signature method useful in a preferred embodiment of the present invention.

DETAILED DESCRIPTION OF A PREFERRED EMBODIMENT

Figure 1:
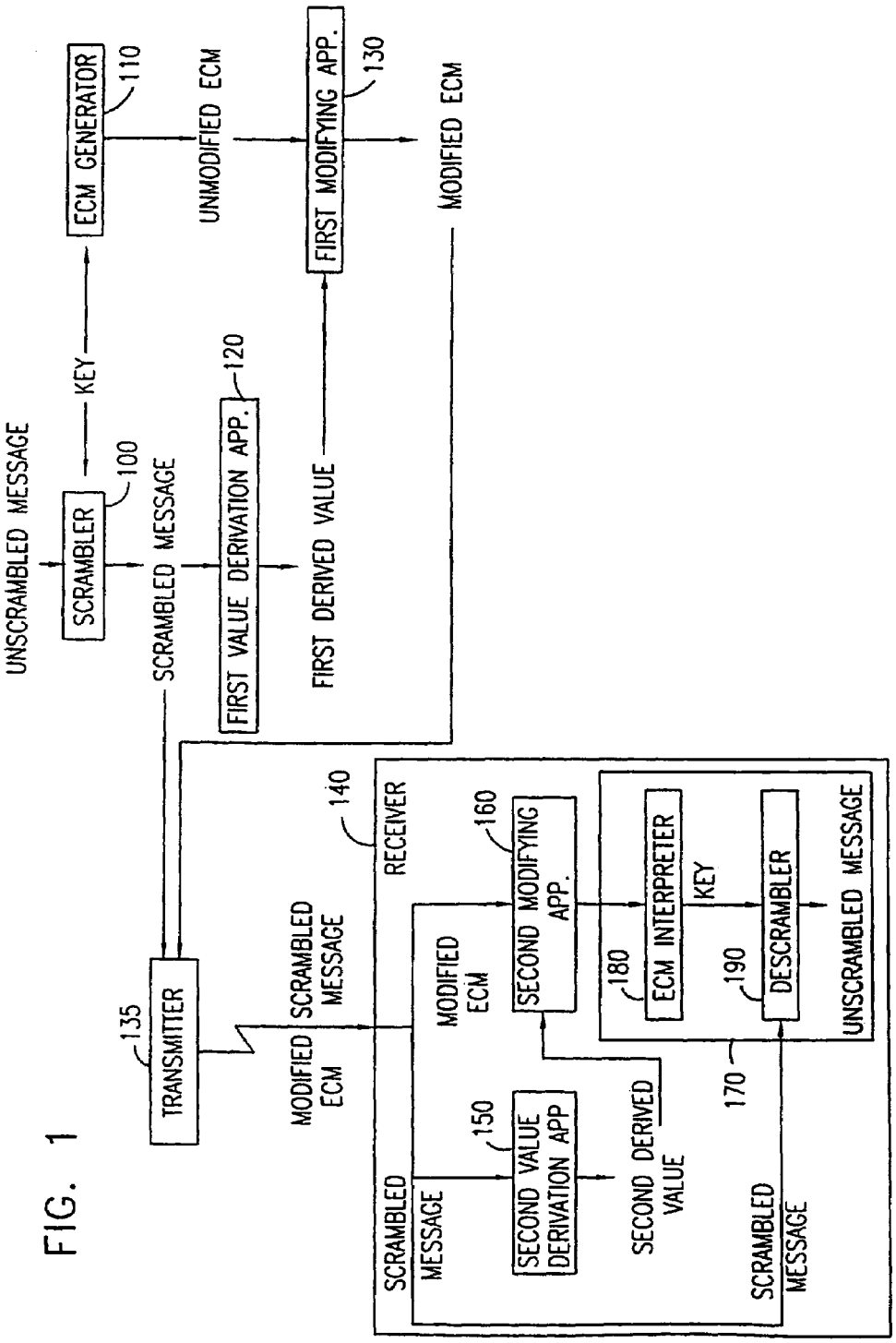
FIG. 1 is a simplified partially pictorial, partially block diagram illustration of a system for determining that all of a scrambled message has been successfully received, constructed and operative in accordance with a preferred embodiment of the present invention.

Reference is now made to FIG. 1 which is a simplified partially pictorial, partially block diagram illustration of a system for determining that all of a scrambled message has been successfully received, the system being constructed and operative in accordance with a preferred embodiment of the present invention. The system of FIG. 1 preferably comprises a scrambler 100. The scrambler 100 and other elements of FIG. 1, except as otherwise described below, are typically implemented in an appropriate combination of hardware and software as is well known in the art. The scrambler 100 is typically operative, as is well known in the art, to receive an unscrambled message and a key and to employ an appropriate scrambling algorithm to scramble the unscrambled message using the key, thus producing a scrambled message. One example of an appropriate implementation of the scrambler 100 is described in document TS 101 197-1, referred to above.

The system of FIG. 1 also preferably comprises an ECM generator 110. The ECM generator 110 is typically operative, upon receiving the same key received by the scrambler 100, to generate an ECM capable of being processed to produce the key, as is well known in the art. The ECM generated by the ECM generator 110 is termed herein an "unmodified ECM". Typically, the ECM generator 110 is implemented in a smart card, as is well known in the art. One example of an appropriate implementation of the ECM generator 110 is described in documents TS 101 197-1, referred to above.

It is appreciated that the particular method suggested by FIG. 1 for generating an ECM is shown by way of example only and is not meant to be limiting. It is known to generate an ECM using several different methods. In particular, it is known to generate a key from a seed via a one-way function and to encode only the seed, and not the key itself as implied in the system of FIG. 1, in an ECM, and such a method of ECM generation may be preferred. Methods of the seed/one way function type are described in U.S. Pat. Nos. 5,282,249 and 5,481,609 both to Cohen et al., referred to above.

It is also known in the art for ECMs to be generated first and keys being generated therefrom, and for a key to be generated by any one of the following: a secure chip; a smart card: any other appropriate hardware device capable of generating a key; and any appropriate software algorithm. It is appreciated that all of the above are examples only and not intended to limit the generality of the present invention, and that a skilled person of the art could appropriately modify the present invention in order to make it compatible with one or more known ECM generation techniques.

It is also known in the art to sign an ECM, typically using any appropriate digital signature generating method well known in the art. An appropriate digital signature generating method for use in the present invention, typically by the ECM generator 110, would comprise a method sensitive to changes in the input ECM, such that a modified ECM and an unmodified ECM would produce different signatures. In a case where signatures are used, the signature is generally comprised in the ECM. Alternatively, the signature may be sent separately from the ECM and may be associated with the ECM in some way, in particular and without limiting the generality of the foregoing, the signature may be sent in the same stream as the ECM, in the same stream as the message, or in another stream.

Reference is now made to Appendices A and B, which together comprise a preferred implementation, in the C programming language, of a digital signature method useful in a preferred embodiment of the present invention. It is appreciated that Appendices A and B are provided solely for the purpose of providing a particularly detailed example, and that the example of Appendices A and B is not meant to be limiting.

The apparatus of FIG. 1 also typically comprises first value derivation apparatus 120. First value derivation apparatus 120 typically receives the scrambled message from the scrambler 100 and is typically operative to produce therefrom a first derived value, typically using a first value derivation function. The first value derivation function may comprise any appropriate function for producing a numeric value from an input, such that the numeric value produced is sensitive to small changes in the input. Typically, the first value derivation function may comprise a hash function. Hash functions are well known in the art.

The apparatus of FIG. 1 also typically comprises first modifying apparatus 130. First modifying apparatus 130 typically receives the unmodified ECM from the ECM generator 110 and also receives the first derived value from first value derivation apparatus 120. First modifying apparatus 130 is typically operative to produce a modified ECM by applying a first modification function to the unmodified ECM, the first modification function being typically based, at least in part, on the first derived value. Preferably, the first modification function is chosen to have a known inverse and to produce different modified ECMs from a given unmodified ECM for different input first derived values. Typically, the first modification function comprises an exclusive-OR (XOR) function using the first derived value, it being appreciated that such a function, given the first derived value, is its own inverse. Typically, the first modifying apparatus 130 is implemented in a smart card of a type well known in the art.

The system of FIG. 1 also typically comprises a transmitter 135, which may comprise any suitable transmitter, as is well-known in the art, and which is typically implemented in hardware. The transmitter 135 typically receives the scrambled message from the scrambler 100 and also typically receives the modified ECM from the first modifying apparatus 130, and is typically operative to transmit both the scrambled message and the modified ECM. Typically, but not necessarily, the transmitter 135 is operative to transmit a broadcast transmission, using any appropriate broadcast method known in the art, such as, for example, any one or any appropriate combination of more than one of the following satellite broadcast transmission; cable-based transmission; fiber-based transmission: and terrestrial broadcast transmission, including digital terrestrial transmission. Alternatively, it is appreciated that the scrambled message may be transmitted by a non-broadcast method such as, for example, by one or more of the following: point to point delivery. LAN delivery, and Internet delivery.

It is appreciated that different methods for transmitting a scrambled message and an appropriate ECM are well-known in the art, and that, without limiting the generality of the foregoing, an ECM may be transmitted: before, together with, or after the scrambled message, on the same transmission channel as the scrambled message or on a different transmission channel; in the same stream of transmission as the scrambled message, or in a different stream.

The system of FIG. 1 also typically comprises a receiver 140, typically located remotely from the transmitter 135 and the other previously described components of the system of FIG. 1, although it is appreciated that local siting of the receiver 140 is also possible.

The receiver 140 typically comprises conventional transmission reception equipment (not shown) suitable for receiving a transmission from the transmitter 135, the transmission typically comprising the scrambled message and the modified ECM transmitted by the transmitter 135. The scrambled message and the modified ECM are separated in the receiver for further processing, using any appropriate means well known in the art.

The receiver 140 also typically comprises second value derivation apparatus 150, typically receiving the scrambled message and operative to produce therefrom a second derived value, typically by employing a second value derivation function. Preferably, the second derived value is identical to the first derived value, described above and produced by first value derivation apparatus 120. It is appreciated, however, that embodiments of the present invention in which the first derived value and the second derived value are not identical are also possible. In a case where the first derived value and the second derived value are identical, the second value derivation function is typically identical to the first value derivation function, described above.

The receiver 140 also typically comprises second modifying apparatus 160, second modifying apparatus 160 typically receiving the modified ECM, as received from the transmitter 135, and also receiving the second derived value from the second value derivation apparatus 150. Second modifying apparatus 160 is preferably operative to produce an unmodified ECM by applying a second modification function to the modified ECM, the second modification function being typically based, at least in part, on the second derived value. Second modifying apparatus 160 is typically implemented in a smart card, as is well known in the art.

As explained above with reference to first modifying apparatus 130, the second modification function, based on the second derived value, will typically be an inverse of the first modification function based on the first derived value. Also as explained above, an exclusive-OR function using the second derived value would be an appropriate choice of second modification function, provided that the second derived value is the same as the first derived value.

The receiver 140 also typically comprises employing apparatus 170, preferably receiving the unmodified ECM from the second modifying apparatus 160 and typically also receiving the scrambled message as transmitted by the transmitter 135. The employing apparatus 170 is operative to employ the unmodified ECM in such a way as to determine whether the entire scrambled message has been received. It is appreciated that a number of different embodiments of the present invention might be possible using different appropriate types of employing apparatus such as, for example, employing apparatus which checks a digital signature comprised in the unmodified ECM, or any other appropriate employing apparatus.

Without limiting the generality of the foregoing, the employing apparatus 170 typically comprises an ECM interpreter 180, typically receiving the unmodified ECM from second modifying apparatus 160 and operative to produce a key therefrom, as is well known in the art. It is appreciated, as is well known in the art, that the key produced by the ECM interpreter 180 will typically be identical to the key input to the scrambler 100, as described above. Alternatively, if a non-symmetric scrambling method is used by the scrambler 100, the key produced by the ECM interpreter 180 will typically be a complementary key for descrambling the scrambled message, as well known in the art. The ECM interpreter 180 is typically implemented in a smart card, as is well known in the art.

Employing apparatus 170 also typically comprises a descrambler 190, typically receiving the key from the ECM interpreter 180 and the scrambled message as delivered to employing apparatus 170 and typically operative to descramble the scrambled message using the key, as is well known in the art. It is appreciated that any suitable method known in the art may be employed to verify or observe directed that the unscrambled message has been correctly unscrambled, correct unscrambling of the message establishing that the message has been completely received.

The operation of the system of FIG. 1 is now briefly described. An unscrambled message to be sent is scrambled by the scrambler 100 in accordance with a key; also, an unmodified ECM for producing the key is produced by the ECM generator 110.

The unmodified ECM is transformed into a modified ECM, as described above, by first modifying apparatus 130, which also receives as input a first derived value produced by first value derivation apparatus 120 from the scrambled message. Thus, a modified ECM is produced, the modified ECM requiring further modification, typically based on a derived value of the entire scrambled message as described above, before the modified ECM can be used to produce a descrambling key.

The modified ECM and the scrambled message are transmitted to the receiver 140 by the transmitter 135. At the receiver 140, a second derived value is derived from the scrambled message by second value derivation apparatus 150. The second derived value is supplied to second modifying apparatus 160, which also received the modified ECM and produces therefrom the unmodified ECM, thus inverting the operation which produced the modified ECM before broadcast. The unmodified ECM is then appropriately utilized such as, for example, to produce the key and unscramble the scrambled message in the ECM interpreter 180 and the descrambler 190. Alternatively or additionally, the unmodified ECM may be used by a charging subsystem (not shown) to charge a user of the system of FIG. 1 or a user of the receiver 140 for receiving the message, since the existence of the unmodified ECM within the receiver is proof of receipt of the message. Alternatively or additionally, an indication of receipt of the message may be stored in a storage subsystem (not shown) of the system of FIG. 1, or transmitted to the transmitter of the message or to any other appropriate location.

Figure 2:
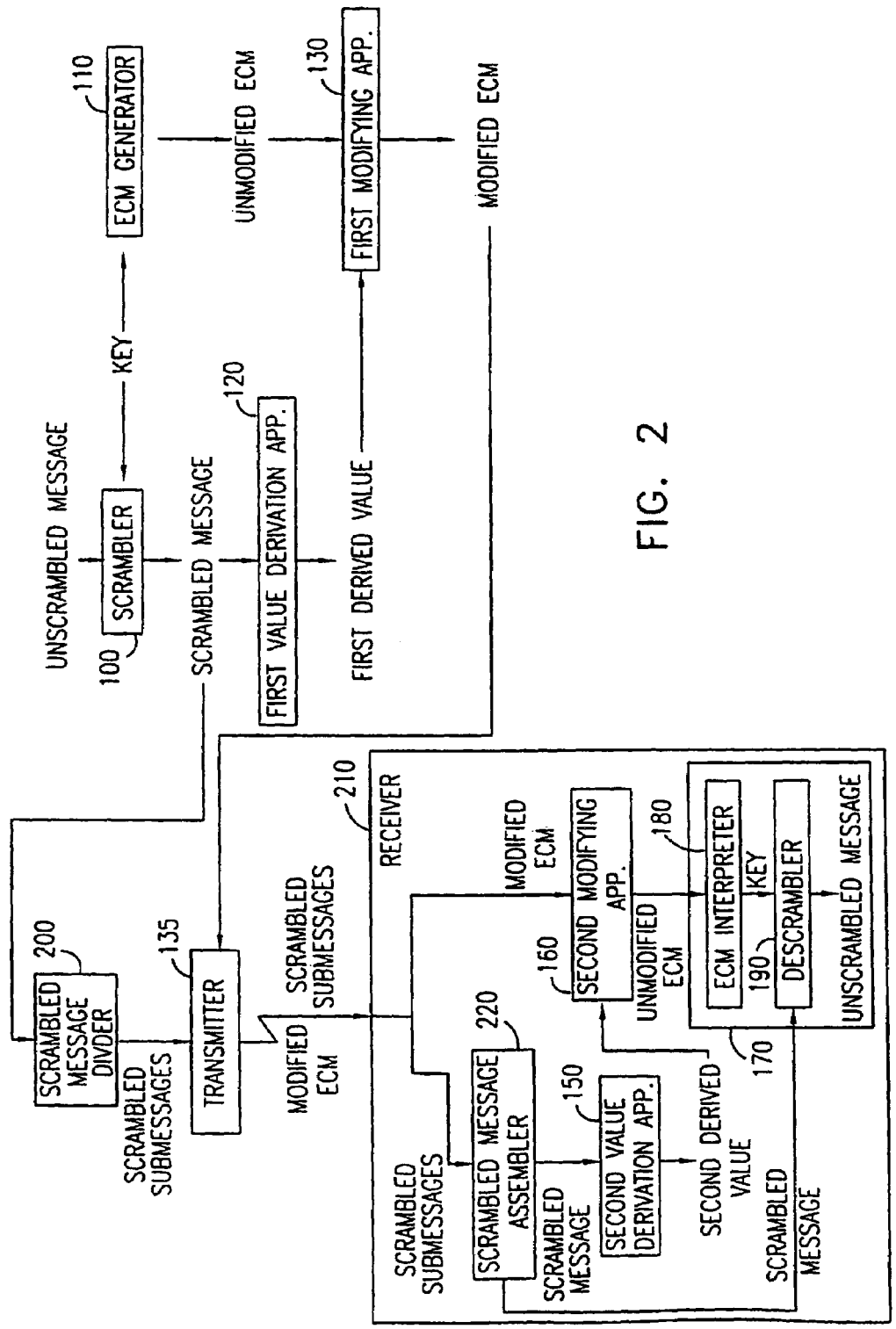
FIG. 2 is a simplified partially pictorial, partially block diagram illustration of a system for determining that all of a scrambled message has been successfully received, constructed and operative in accordance with another preferred embodiment of the present invention.

Reference is now made to FIG. 2, which is a simplified partially pictorial, partially block diagram illustration of a system for determining that all of a scrambled message has been successfully received, constructed and operative in accordance with another preferred embodiment of the present invention. The system of FIG. 2 is similar to the system of FIG. 1, except as described below.

The present invention is believed to be particularly useful in a case where a message is divided into a plurality of submessages, each submessage being transmitted separately. Dividing a message, particularly a long message, into a plurality of submessages is well-known in the art.

The system of FIG. 2 preferably comprises a scrambled message divider 200 for dividing the message into a plurality of scrambled submessages before transmission. The system of FIG. 2 also preferably comprises a receiver 210, similar to the receiver 140 of FIG. 1, in place of the receiver 140 of FIG. 1. The receiver 210 preferably comprises a scrambled message assembler 220. The scrambled message divider 200 and the scrambled message assembler 220 are preferably operative, as is well known in the art, to divide and reassemble, respectively, a message being transmitted. It will be appreciated by a person reasonably skilled in the art that, in light of the above discussion of FIG. 1, the system of FIG. 2 is suitable for determining that all submessages comprised in a scrambled message have been successfully received.

Figure 3:
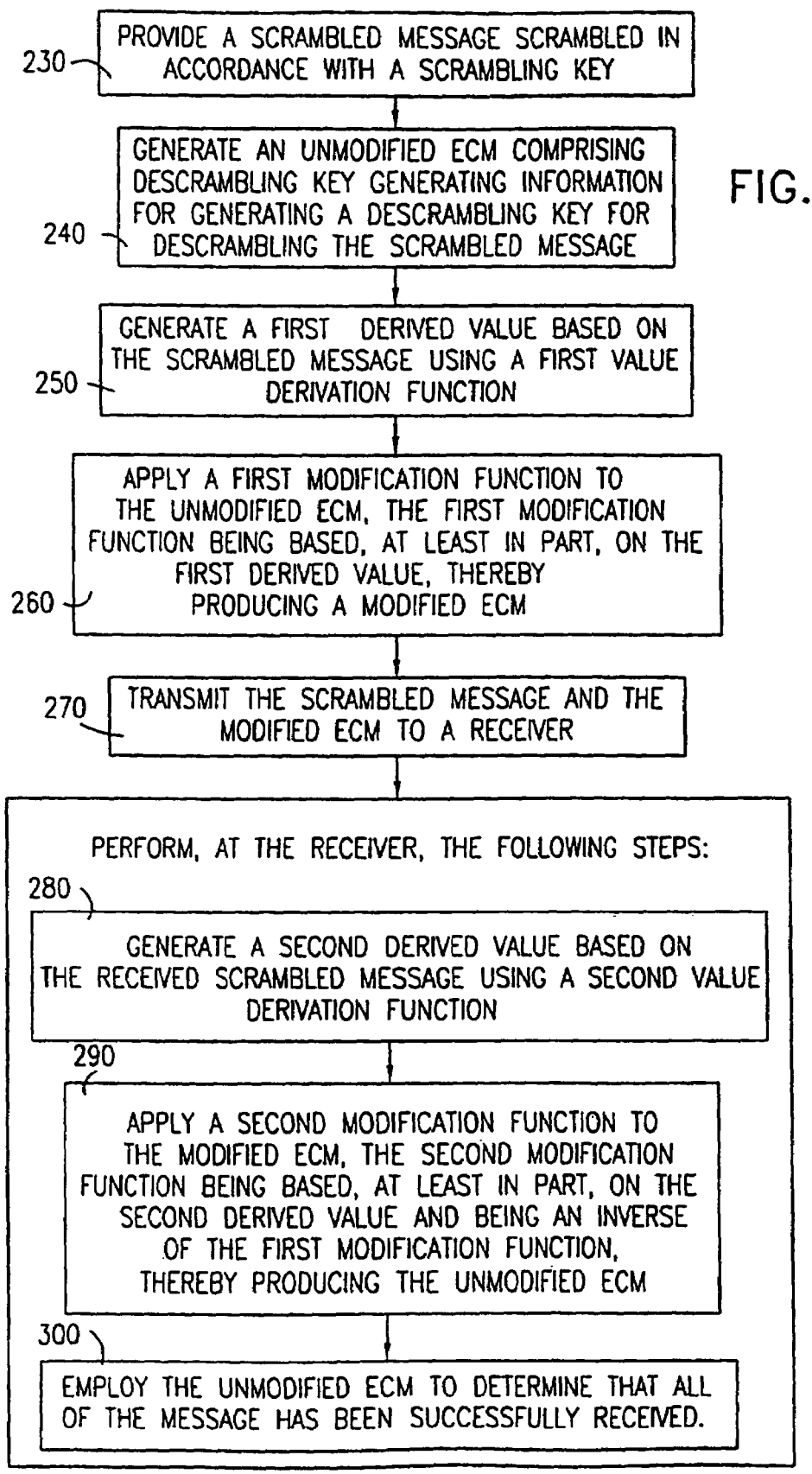
FIG. 3 is a simplified flowchart illustration of a preferred method of operation of the system of FIG. 1.

Reference is now made to FIG. 3, which is a simplified flowchart illustration of a preferred method of operation of the system of FIG. 1. It may be appreciated that the method of FIG. 3 may be modified by a person reasonably skilled in the art to be a preferred method of operation of the system of FIG. 2.

The method of FIG. 3 preferably comprises the following steps:

A scrambled message is provided, the message being scrambled in accordance with a scrambling key (step 230). An unmodified ECM is generated, the unmodified ECM comprising descrambling key generating information for generating a descrambling key for descrambling the scrambled message (step 240).

A first derived value based on the scrambled message is generated using a first value derivation function (step 250), typically as described above with reference to FIG. 1.

A first modification function is applied to the unmodified ECM, the first modification function being based, at least in part, on the first derived value, thereby producing a modified ECM (step 260), typically as described above with reference to FIG. 1.

The scrambled message and the modified ECM are transmitted to a receiver (step 270), using any appropriate means.

At the receiver, the following steps are performed:
- a second derived value is generated, typically based on the received scrambled message using a second value derivation function (step 280), typically as described above with reference to FIG. 1:
- a second modification function is applied to the modified ECM, the second modification function being based, at least in part, on the second derived value and being an inverse of the first modification function, thereby producing the unmodified ECM (step 290), typically as described above with reference to FIG. 1; and
- the unmodified ECM is employed to determine that all of the message has been successfully received (step 300); typically, as described above with reference to FIG. 1, step 300 includes descrambling the scrambled message.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

APPENDIX A

```
// Packet signature algorithm in C language:
typedef unsigned char byte;
typedef unsigned short ushort;
// Subroutine used to mix individual bytes into an 8-byte buffer:
void mix_byte(byte inbyte, byte buffer[8])
{
  byte a, b, c, d;
  ushort i, m;
  static byte mix_table[0x40] =
    {
      0xE6, 0x1A, 0x39, 0x55, 0x86, 0x95, 0xF0, 0xFC,
      0x73, 0x6B, 0xDF, 0x1E, 0x80, 0x2B, 0x28, 0x7D,
      0x79, 0xB1, 0x34, 0x15, 0x60, 0x25, 0x96, 0xF7,
      0xEA, 0x3C, 0x74, 0xEE, 0x3D, 0x8A, 0xE8, 0x2A,
      0x16, 0xE4, 0xF4, 0x4B, 0xE5, 0xAA, 0x4E, 0x77,
      0xEC, 0x2E, 0x34, 0xB3, 0xAE, 0x7B, 0xCD, 0xDB,
      0x13, 0xF6, 0x9A, 0x76, 0x99, 0x9C, 0xC8, 0xD3,
      0xBB, 0x5E, 0x05, 0x24, 0xA0, 0x01, 0x91, 0x06
    };
  a = inbyte;
  for (i = 0; i <= 4; i += 2)
  {
```

APPENDIX A-continued

```
    b = mix_table[buffer[i] & 0x3f];
    c = a + b - buffer[i+1];
    d = (buffer[i] - buffer[i+1]) ^ a;
    m = d * c;
    buffer[i + 2] ^= (m & 0xff);
    buffer[i + 3] += m >> 8;
    a = ((a << 1) | (a >> 7)) + 0x49;
  }
  m = buffer[6] * buffer[7];
  a = (m & 0xff) + buffer[0];
  if (a < buffer[0])
    a ++;
  buffer[0] = a + 0x39;
  a = (m >> 8) + buffer[1];
  if (a < buffer[1])
    a ++;
  buffer[1] = a + 0x8f;
}
```

APPENDIX B

```
// Subroutine used to append a 4-byte signature and 1-byte checksum
// to the end of a 27-byte message (total signed message = 27+4+ 1 =
// 32 bytes):
void sign_packet(byte pkt[32])
{
  byte t, buffer[8];
  ushort i;
  // Initialize workspace:
  for (i = 0; i < 8; i ++)
    buffer[i] = 0;
  // Call core routine with each of first 27 bytes in turn:
  for (i = 0; i < 27; i ++)
    mix_byte(pkt[i], buffer);
  // Call core routine twice to generate each of 4 signature bytes:
  for (t = i = 0; i < 4; i ++)
  {
    mix_byte(t, buffer);
    mix_byte(t, buffer);
    pkt[27 + i] = t = buffer[7];
  }
  // Put checksum in last byte (packet bytes sum to zero):
  for (pkt[31] = i = 0; i < 31; i ++)
    pkt[31] -= pkt[i];
}
```

What is claimed is:

1. In a system where a scrambled message is scrambled in accordance with a scrambling key and is capable of being descrambled in accordance with a descrambling key, descrambling key generating information for generating the descrambling key being comprised within a control message (ECM) associated with the scrambled message, an unmodified ECM comprising descrambling key generating information for generating a descrambling key for descrambling the scrambled message being generated by the system, a first derived value based on the scrambled message using a first value derivation function being generated by the system, a first modification function being applied to the unmodified ECM thereby producing a modified ECM, the first modification function being based, at least in part, on the first derived value, the scrambled message and the modified ECM being transmitted to a receiver, a method comprising, at the receiver:

receiving the scrambled message and the modified ECM;

generating a second derived value based on the received scrambled message using a second value derivation function;

applying a second modification function to the modified ECM thereby producing the unmodified ECM, the second modification function being based, at least in part, on the second derived value; and employing the unmodified ECM to determine that all of the message has been successfully received.

2. The method according to claim 1, wherein the employing includes:
   producing the descrambling key from the unmodified ECM; and
   descrambling the scrambled message using the descrambling key.

3. A method for producing a modified ECM for use in a system for determining that all of a scrambled message has been successfully received, the scrambled message being scrambled in accordance with a scrambling key and being capable of being descrambled in accordance with a descrambling key, descrambling key generating information for generating the descrambling key being comprised within a control message (ECM) associated with the scrambled message, the method comprising:
   providing a scrambled message scrambled in accordance with a scrambling key;
   generating an unmodified ECM comprising descrambling key generating information for generating a descrambling key for descrambling the scrambled message;
   generating a first derived value based on the scrambled message using a first value derivation function; and
   applying a first modification function to the unmodified ECM thereby producing a modified ECM, the first modification function being based, at least in part, on the first derived value.

4. The method according to claim 3 and also comprising transmitting at least one of:
   the modified ECM; and
   the scrambled message.

5. In a system where a scrambled message is scrambled in accordance with a scrambling key and is capable of being descrambled in accordance with a descrambling key, descrambling key generating information for generating the descrambling key being comprised within a control message (ECM) associated with the scrambled message, an unmodified ECM comprising descrambling key generating information for generating a descrambling key for descrambling the scrambled message being generated by the system, a first derived value based on the scrambled message using a first value derivation function being generated by the system, a first modification function being applied to the unmodified ECM, the first modification function being based, at least in part, on the first derived value, thereby producing a modified ECM, the scrambled message and the modified ECM being transmitted to a receiver, apparatus comprising:
   second value derivation apparatus for generating a second derived value based on the received scrambled message using a second value derivation function;
   second modifying apparatus for applying a second modification function to the modified ECM thereby producing the unmodified ECM, the second modification function being based, at least in part, on the second derived value; and
   employing apparatus for employing the unmodified ECM to determine that all of the message has been successfully received.

6. Apparatus according to claim 5 and also comprising:
   a second smart card, wherein the second smart card comprises at least one of the following:
   the second modifying apparatus; and
   at least a portion of the employing apparatus.

7. Apparatus for producing a modified ECM for use in a system for determining that all of a scrambled message has been successfully received, the scrambled message being scrambled in accordance with a scrambling key and being capable of being descrambled in accordance with a descrambling key, descrambling key generating information for generating the descrambling key being comprised within a control message (ECM) associated with the scrambled message, the apparatus comprising:
   a scrambler for scrambling a message in accordance with a scrambling key, thereby producing a scrambled message;
   an ECM generator for generating an unmodified ECM comprising descrambling key generating information for generating a descrambling key for descrambling the scrambled message;
   first value derivation apparatus for generating a first derived value based on the scrambled message using a first value derivation function; and
   first modifying apparatus for applying a first modification function to the unmodified ECM thereby producing a modified ECM, the first modification function being based, at least in part, on the first derived value.

8. The apparatus according to claim 7 and also comprising a transmitter operative to transmit at least one of:
   the modified ECM; and
   the scrambled message.

9. Apparatus according to claim 7 and also comprising:
   a first smart card, wherein the first smart card comprises at least one of the following:
   the ECM generator; and
   the first modifying apparatus.

10. In a system where a scrambled message is scrambled in accordance with a scrambling key and is capable of being descrambled in accordance with a descrambling key, descrambling key generating information for generating the descrambling key being comprised within a control message (ECM) associated with the scrambled message, a method comprising, at a receiver:
   receiving an unmodified ECM comprising descrambling key generating information for generating a descrambling key for descrambling the scrambled message generated by the system;
   applying a first modification function to the unmodified ECM, the first modification function being based, at least in part, on a first derived value based on the scrambled message, thereby producing a modified ECM;
   receiving the scrambled message and the modified ECM;
   generating a second derived value based on the received scrambled message using a second value derivation function;
   applying a second modification function to the modified ECM thereby producing the unmodified ECM, the second modification function being based, at least in part, on the second derived value; and
   employing the unmodified ECM to determine that all of the message has been successfully received.

11. In a system where a scrambled message is scrambled in accordance with a scrambling key and is capable of being descrambled in accordance with a descrambling key, descrambling key generating information for generating the descrambling key being comprised within a control message (ECM) associated with the scrambled message, apparatus comprising:

a receiver operative to receive:
- the scrambled message; and
- an unmodified ECM comprising descrambling key generating information for generating a descrambling key for descrambling the scrambled message;

second value derivation apparatus for generating a second derived value based on the received scrambled message using a second value derivation function;

second modifying apparatus for applying a second modification function to the modified ECM thereby producing the unmodified ECM, the second modification function being based, at least in part, on the second derived value; and employing apparatus for employing the unmodified ECM to determine that all of the message has been successfully received.

* * * * *